United States Patent [19]

Tsutsui

[11] Patent Number: 5,349,549

[45] Date of Patent: Sep. 20, 1994

[54] FORWARD TRANSFORM PROCESSING APPARATUS AND INVERSE PROCESSING APPARATUS FOR MODIFIED DISCRETE COSINE TRANSFORMS, AND METHOD OF PERFORMING SPECTRAL AND TEMPORAL ANALYSES INCLUDING SIMPLIFIED FORWARD AND INVERSE ORTHOGONAL TRANSFORM PROCESSING

[75] Inventor: Kyoya Tsutsui, Kanagawa, Japan

[73] Assignee: Sony Corporation, Tokyo, Japan

[21] Appl. No.: 950,945

[22] Filed: Sep. 24, 1992

[30] Foreign Application Priority Data

Sep. 30, 1991 [JP] Japan .................. 3-276165

[51] Int. Cl.$^5$ .......................................... G06F 15/332
[52] U.S. Cl. .................................................. 364/725
[58] Field of Search ......................................... 364/725

[56] References Cited

U.S. PATENT DOCUMENTS 4,797,847 1/1989 Duhamel ............................ 364/725
5,218,561 6/1993 Iwadare ............................. 364/725

FOREIGN PATENT DOCUMENTS

0463473A2 1/1992 European Pat. Off. .

OTHER PUBLICATIONS

Electronic Engineering, vol. 60, No. 738, Jun. 1988, pp. 99–106, XP000051582, S. Gomez et al: "An Application-Specific FFT Processor."
Proceedings of ICASSP 88, IEEE Press, New York, USA, vol. 4, Apr. 11, 1988, pp. 1989–1992, XP000043448, Surendar Magar et al.: "An Application Specific DSP Chip for 100 MHZ Data Rates."

*Primary Examiner*—Tan V. Mai
*Attorney, Agent, or Firm*—Ian Hardcastle

[57] ABSTRACT

A method for performing a simplified digital spectral analysis on a block of N samples representing an information signal in the time domain, in which the block of N samples is multiplied by a forward transform window to provide a block of N processed samples. The block of processed samples is digitally preprocessed to provide a block of N/4 complex numbers, which is orthogonally transformed, using digital processing equivalent of a Fast Fourier Transform, to provide a block of N/4 transformed complex numbers. The block of transformed complex numbers is then digitally post-processed to provide a block of N/2 spectral coefficients representing the information signal in the frequency domain. In a method of performing a simplified digital temporal analysis on a block of N/2 spectral coefficients representing the information signal in the frequency domain, the block of spectral coefficients is digitally pre-processed to provide a block of N/4 frequency domain complex numbers, which is orthogonally transformed into a block of N/4 time domain complex numbers by digital processing equivalent to a Fast Fourier Transform. The block of N/4 time domain complex numbers is digitally post processed to provide a block of N/2 processed time domain samples, which is re-arrayed and multiplied by an inverse transform window to provide a block of N samples representing the information signal in the time domain.

23 Claims, 7 Drawing Sheets

FORWARD TRANSFORM PROCESSING APPARATUS AND INVERSE PROCESSING APPARATUS FOR MODIFIED DISCRETE COSINE TRANSFORMS, AND METHOD OF PERFORMING SPECTRAL AND TEMPORAL ANALYSES INCLUDING SIMPLIFIED FORWARD AND INVERSE ORTHOGONAL TRANSFORM PROCESSING

FIELD OF THE INVENTION

This invention relates to a forward transform calculating apparatus and method for performing a forward modified discrete cosine transform (MDCT), and to an inverse transform calculating apparatus and method for performing an inverse modified discrete cosine transform (IMDCT).

BACKGROUND OF THE INVENTION

Orthogonal transform coding is known as a way of high efficiency coding sample data signals in the time domain, such as digital signals resulting from sampling analog audio signals. The input signal is divided in time into blocks of a predetermined number of samples. Transform coding orthogonally transforms each block of the input signal into a block of plural spectral coefficients in the frequency domain. Transform coding is typified by the discrete cosine transform (DCT). Discrete cosine transform coding suffers from distortion caused by discontinuous connecting points between adjacent blocks, and which manifests itself as noise. Block distortion has conventionally been reduced by overlapping one end of a block with the end of the adjoining block. A modified discrete cosine transform (MDCF) overlaps a given block with the adjoining blocks on both sides by one half of the block length. The MDCT is well suited for high efficient coding because samples in the overlapped portions are not transmitted. Thus, N/2 spectral coefficients are generated from a frame of N time domain samples.

Discussion of the MDCT and the inverse MDCT (IMDCT) may be found in Motizuki et al., *Constraints in MDCT Filters in Which Plural Block Sizes Co-exist*, SHINGAKU GIHOU, CAS90-10 and DSP90-14, pp. 55 to 60, or in Sugiyama et al., *Adaptive Transform Coding with Adaptive Block Lengths Using MDCT (ATC-ABS)*, ABSTRACTS IN 1990 SPRING MEETING OF ELECTRONIC INFORMATION COMMUNICATION MEETING, A-197.

The modified discrete cosine transform and inverse modified discrete cosine transform will now be briefly described by referring to FIG. 1. In FIG. 1, a given block of sample data in the time domain, such as the J-th block, has an overlap of one-half (50%) with each of the (J−1)-th block and the (J+1)-th block. If the number of samples in the J-th block is N, where N is a natural number, there is an overlap of N/2 samples with the (J−1)-th block, and an overlap of N/2 samples with the (J+1)-th block. Each of the N samples in each block, such as the J-th block, is processed by a forward transform window or pre-filter Wh to produce a block 102 of N windowed samples in the time domain.

The characteristics of the forward transform window or pre-filter Wh are so selected that power density of the transformed data is maximized in conformity with the statistical properties of input signals. The block 102 of N windowed samples in the time domain is processed by a forward MDCT to produce a block 103 of independent spectral coefficients in the frequency domain. The number of spectral coefficients is one half the number of input samples in the block 102, or N/2.

In the inverse transform, the block 103 of N/2 spectral coefficients is processed with a linear IMDCT to produce a block 104 of N processed samples in the time domain. The block 104 of N processed samples is processed by an inverse transform window or synthesizing filter Wf to produce a block 105 of samples in the time domain. The block 105 of samples in the time domain is summed to the preceding and succeeding blocks of samples in the time domain to produce an output signal of samples in the time domain.

A method of high speed processing using a Fast Fourier Transform (FFT) to provide an MDCT and IMDCT has been proposed by Iwatare et al., *A Study in MDCT System and High Speed Processing Method*, SHINGAKU-GIHOU, CAS 90-9, DSP 90-13, pp. 49 to 54, and a similar method has also been proposed in Japanese Patent Early Publication 4-44099 (1992).

The processing method proposed by Iwatare et al. will now be described. The MDCT is defined by the equation:

$$y_0(k) = C_0 \sum_{n=0}^{N-1} x_0(n)h(n)\cos\left(\frac{\pi(2k+1)(2n+N/2+1)}{2N}\right) \quad (1)$$

$$\text{for } 0 \leq k \leq \frac{N}{2} - 1$$

where $x_0$: MDCT input signal
N: block length
h: function of forward transform window
$y_0$: MDCT output signal
$C_0$: constant, and n is an integer between 0 and N−1, and k is an integer between 0 and N/2−1. The block numbers are omitted because MDCT processing is carried out on the time domain data in each block independently. The method for performing an MDCT is substantially independent of the value of $C_0$, so the following description assumes that $C_0=1$.

In the calculation process, $x_0$ is multiplied by the forward transform window to find $x_{01}$:

$$x_{01}(n) = x_0(n)h(n) \text{ for } 0 \leq n \leq N=1 \quad (2)$$

$x_{02}$ is derived from $x_{01}$ in accordance with the following equation:

$$X_{02}(n) = \begin{cases} -x_{01}\left(n + \frac{3N}{4}\right) & \text{for } 0 \leq n \leq \frac{N}{4} - 1 \\ x_{01}\left(n - \frac{N}{4}\right) & \text{for } \frac{N}{4} \leq n \leq N - 1 \end{cases} \quad (3)$$

$x_{03}$ is calculated from in accordance with the following equation:

$$X_{03}(n) = x_{02}(2n) - x_{02}(N-1-2n) \text{ for } 0 \leq n \leq \frac{N}{2} - 1 \quad (4)$$

$x_{03}$ is multiplied by the coefficient shown in equation (5) to produce a block of complex numbers $z_{01}$.

$$z_{01}(n) = x_{03}(2n)\exp\left(-j\frac{2\pi n}{N}\right) \text{ for } 0 \leq n \leq \frac{N}{2} - 1 \tag{5}$$

$z_{01}$ is processed by a Fast Fourier Transform (FFT) having a length of N/2 to produce a block of complex numbers $z_{02}$.

$$z_{02}(k) = \sum_{n=0}^{N/2-1} z_{01}(n)\exp\left(-j\frac{2\pi kn}{(N/2)}\right) \tag{6}$$

$$\text{for } 0 \leq k \leq \frac{N}{2} - 1$$

$y_{01}$ is a block of real numbers calculated from the block of complex numbers $z_{02}$ as follows:

$$y_{01}(k) = Re\left(Z_{02}(k)\exp\left(-j\frac{2\pi(k+1/2)}{2N}\right)\right) \tag{7}$$

$$\text{for } 0 \leq k \leq \frac{N}{2} - 1$$

$y_{01}$ thus calculated thus coincides with $y_0$ as defined in equation (1), as demonstrated by the above-cited treatise *A Study in MDCT System and High Speed Processing Method*.

Conversely, the IMDCT is defined by the following equation (8):

$$x_1(n) = C_1 f(n) \sum_{k=0}^{N/2-1} y_1(k)\cos\left(\frac{2\pi(2k+1)(2n+N/2+1)}{2N}\right) \tag{8}$$

$$\text{for } 0 \leq n \leq N - 1$$

where
$y_1$: IMDCT input signal
N: block length
f: inverse transform window function
$x_1$: IMDCT output signal
$C_1$: constant, and where n is an integer between 0 and N−1, and k is an integer between 0 and N/2−1. The block numbers are omitted because IMDCT processing is carried out on the frequency domain data in each block independently. The present IMDCT calculating method is substantially independent of the value of $C_1$, so the following description assumes that $C_1 = 1$.

In the known calculation method, $y_1$ is re-arrayed in accordance with the following equation to produce $y_{11}$.

$$y_{11}(k) = \begin{cases} y_1(2k) & \text{for } 0 \leq k \leq \frac{N}{4} - 1 \\ -y_1(N-1-2k) & \text{for } \frac{N}{4} \leq k \leq \frac{N}{2} - 1 \end{cases} \tag{9}$$

$y_{11}$ is multiplied by the coefficient shown in equation (10) to produce a block of complex numbers $z_{11}$.

$$z_{11}(k) = y_{11}(k)\exp\left(-j\frac{2\pi k}{N}\right) \text{ for } 0 \leq k \leq \frac{N}{2} - 1 \tag{10}$$

$z_{11}$ is processed by an inverse FFT of a length of N/2 to produce a block of complex numbers $z_{12}$.

$$z_{12}(n) = \sum_{n=0}^{N/2-1} z_{11}(k)\exp\left(j\frac{2\pi nk}{(N/2)}\right) \tag{11}$$

$$\text{for } 0 \leq n \leq \frac{N}{2} - 1$$

The block of complex numbers $z_{12}$ is multiplied by the coefficient shown in equation (12), and the real part is extracted to produce the block of real numbers $x_{11}$.

$$x_{11}(n) = Re\left(2z_{12}(n)\exp\left(-j\frac{2\pi(n+1/2)}{2N}\right)\right) \tag{12}$$

$$\text{for } 0 \leq n \leq \frac{N}{2} - 1$$

$x_{11}$ is re-arrayed with a sign change and multiplied by the inverse transform window in accordance with the equation:

$$x_{12}(n) = \begin{cases} f(n)x_{11}\left(n+\frac{N}{4}\right) & \text{for } 0 \leq n \leq \frac{N}{4} - 1 \\ -f(n)x_{11}\left(\frac{3N}{4}-1-n\right) & \text{for } \frac{N}{4} \leq n \leq \frac{3N}{4} - 1 \\ -f(n)x_{11}\left(n-\frac{3N}{4}\right) & \text{for } \frac{3N}{4} \leq n \leq \frac{N}{2} - 1 \end{cases} \tag{13}$$

This coincides with $x_1$ as defined in equation (8), as demonstrated by the above-cited treatise *A Study in MDCT System and High Speed Processing Method*.

The processing to perform an MDCF to determine the spectral coefficients for block of N samples and to perform a complementary IMDCT involves performing a complex number FFT having a length of N/2. Suitable algorithms for this are described in E. Oran Brigham, THE FAST FOURIER TRANSFORM. In chapter 11, entitled *Theory of FFT Algorithm with a Base of 2*, the algorithm described on pages 196 to 199 in the Japanese translation by Miyagawa et al. has the following requirements:

N/4 log(N/2) complex number multiplications,
N/2 log(N/2) complex number additions, and
a work area for storing N/2 complex numbers.

Thus, the method described above is not fully suitable for high-speed processing, especially when a small processing system is used.

Objects and Summary of the Invention

In view of the above-depicted state of the art, it is an object of the present invention to provide a signal processing method wherein the processing operations for performing an MDCT and an IMDCT are carried out using an FFT with a shorter length. This is to reduce the number of processing operations, such as the number of multiplications and the number of additions, to reduce the ,work area required, and to achieve a higher operating speed.

In accordance with a first aspect of the present invention, a forward transform processing apparatus is provided for carrying out a modified discrete cosine transform on a block of N samples of a digital input signal in the time domain to provide a block of N/2 spectral coefficients in the frequency domain. The apparatus comprises a circuit that multiplies the block of N samples by a forward transform window to provide a block of N forward transform window processed samples, and a transform circuit that transforms the block of N forward transform window processed samples to provide a block of N/2 spectral coefficients. The transform circuit includes a preprocessing circuit that preprocesses the block of N forward transform window processed samples to provide a block of N/4 complex numbers. The transform circuit also includes an FFT circuit that performs processing equivalent to a Fast Fourier Transform on the block of N/4 complex numbers to provide a transformed block of N/4 complex numbers. Finally, the transform circuit includes a postprocessing circuit that post-processes the transformed block of complex numbers to provide the block of N/2 spectral coefficients.

In accordance with a second aspect of the present invention, an inverse transform processing apparatus is provided for carrying out a inverse modified discrete transform on a block of N/2 spectral coefficients in the frequency domain to provide a block of N samples in the time domain as a digital output signal. The apparatus comprises an inverse transform circuit that inversely transforms the block of N/2 spectral coefficients to provide a block of N/2 processed samples in the time domain, and a circuit that rearrays and multiplies the block of N/2 processed samples in the time domain by an inverse transform window to provide the block of N samples in the time domain. The inverse transform circuit includes a pre-processing circuit that pre-processes the spectral coefficients in the block of N/2 spectral coefficients to provide a block of N/4 frequency domain complex numbers, and an FFT circuit that performs processing equivalent to a Fast Fourier Transform on the block of N/4 frequency domain complex numbers to provide a block of N/4 time domain complex numbers. Finally, the inverse transform circuit includes a post-processing circuit that post-processes the block of N/4 time domain complex numbers to provide the block of N/2 processed samples in the time domain.

In accordance with a third aspect of the present invention, a method is provided for performing a modified discrete cosine transform on a block of N samples of a digital input signal in the time domain to provide a block of N/2 spectral coefficients in the frequency domain. According to the method, the block of N samples is multiplied by a forward transform window to provide a block of N forward transform window processed samples, and the block of N forward transform window processed samples is transformed to provide a block of N/2 spectral coefficients. The step of transforming the block of N forward transform window processed samples includes the steps of preprocessing the block of N forward transform window processed samples to provide a block of N/4 complex numbers; performing processing equivalent to a Fast Fourier Transform on the block of N/4 complex numbers to provide a transformed block of N/4 complex numbers; and post-processing the transformed block of complex numbers to provide the block of N/2 spectral coefficients.

In accordance with a fourth aspect of the present invention, a method is provided for performing an inverse modified discrete transform on a block of N/2 spectral coefficients in the frequency, domain to provide a block of N samples in the time domain as a digital output signal. According to the method, the block of N/2 spectral coefficients is inversely transformed to provide a block of N/2 processed samples in the time domain, and the block of N/2 processed samples in the time domain is rearrayed and multiplied by an inverse transform window to provide the block of N samples in the time domain. The step of inversely transforming the block of N/2 spectral coefficients includes the steps of pre-processing the spectral coefficients in the block of N/2 spectral coefficients to provide a block of N/4 frequency domain complex numbers, performing processing equivalent to a Fast Fourier Transform on the block of N/4 frequency domain complex numbers to provide a block of N/4 time domain complex numbers, and post-processing the block of N/4 time domain complex numbers to provide the block of N/2 processed samples in the time domain.

In accordance with a fifth aspect of the present invention, a medium is provided for storing a compressed digital signal comprising a block of N/2 spectral coefficients. The block of N/2 spectral coefficients is derived from a block of N samples of a digital input signal in the time domain by a modified discrete cosine transform performed according to a method that includes the steps of multiplying the block of N samples by a forward transform window to provide a block of N forward transform window processed samples, and transforming the block of N forward transform window processed samples to provide a block of N/2 spectral coefficients. The step of transforming the block of N forward transform window processed samples includes the steps of preprocessing the block of N forward transform window processed samples to provide a block of N/4 complex numbers; performing processing equivalent to a Fast Fourier Transform on the block of N/4 complex numbers to provide a transformed block of N/4 complex numbers; and post-processing the transformed block of complex numbers to provide the block of N/2 spectral coefficients.

In the method and apparatus according to the invention, a linear forward transform for providing an MDCT of N samples of a digital input signal may be realized by applying FFT processing to complex signals each having a length of N/4. This significantly reduces the number of processing operations and the work area required.

Additionally, in the apparatus and method according to the invention, a linear inverse transform for providing an IMDCT of N/2 independent spectral coefficients may be performed by applying FFT processing to complex signals each having a length of N/4. This also significantly reduces the number of processing operations and work area required.

DETAILED DESCRIPTION OF THE INVENTION

Figure 1:
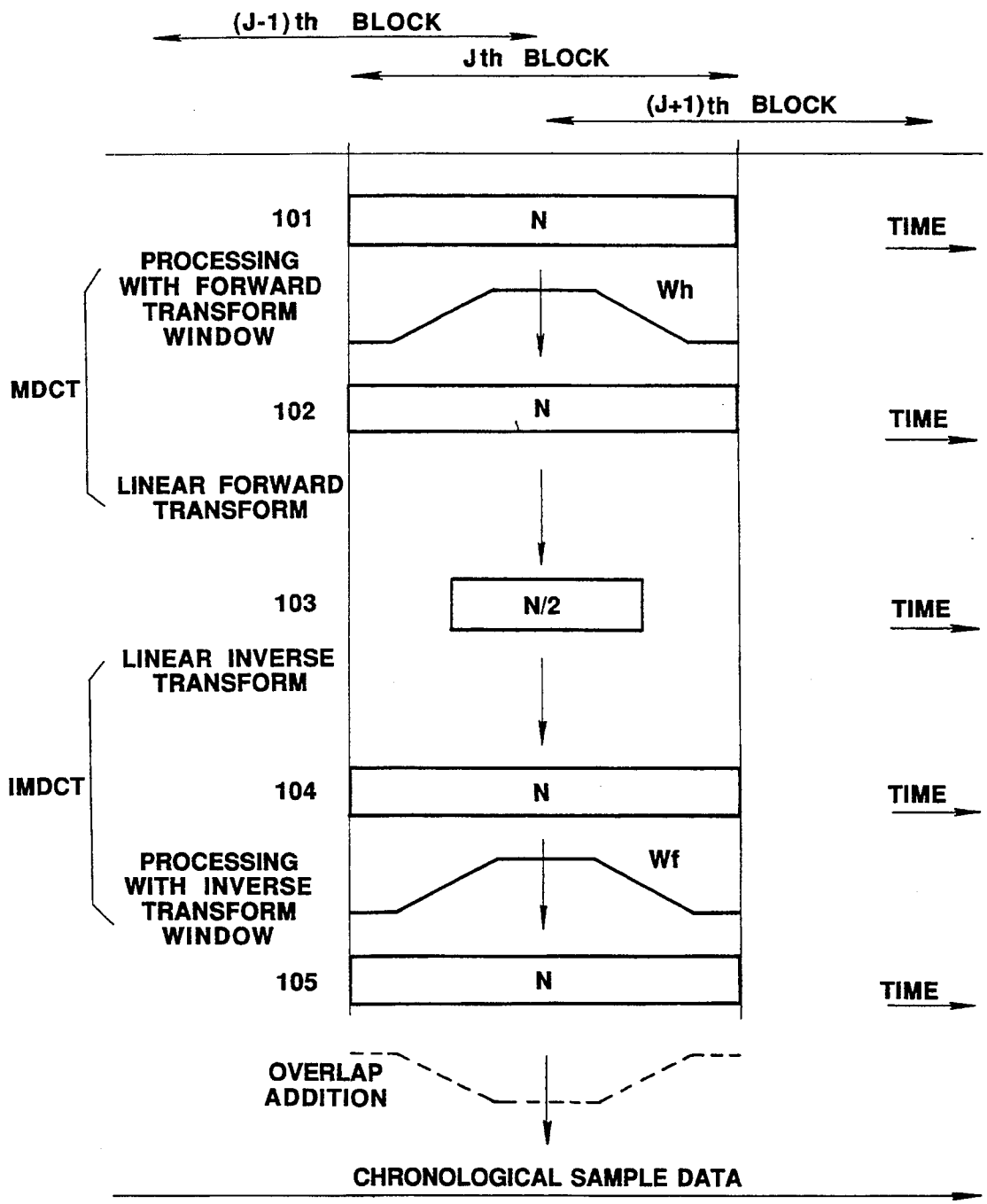
FIG. 1 is a diagrammatic view showing the processing steps for performing a modified discrete cosine transform (MDCT) and an inverse modified discrete cosine transform (IMDCT).

The calculation principles of the present invention will be described before practical embodiments of the apparatus and the method according to the present invention are described.

To calculate an MDCT using the apparatus and the method of the present invention, a block of N/4 complex numbers $Z_{01}$, given by the following equation (14), $$Z_{01}(n) = (x_{03}(2n) + jx_{03}(2n + 1))\exp\left(-j\frac{2\pi n}{(N/2)}\right) \quad (14)$$

for $0 \leq n \leq \frac{N}{4} - 1$ is derived from $x_{03}$ of equation (4), and a block of N/2 complex numbers $Z_{02}$ is calculated in accordance with the equation:

$$Z_{02}(k) = \sum_{n=0}^{N/4-1} Z_{01}(n)\exp\left(-j\frac{2\pi kn}{(N/4)}\right) \quad (15)$$

for $0 \leq k \leq \frac{N}{2} - 1$

From the block of complex numbers $Z_{02}$ of equation (15), a block of complex numbers $Z_{03}$ and a block of complex numbers $Z_{04}$, each block having a length N/2, are calculated in the following manner:

$$Z_{03}(k) = \frac{1}{2}\left(Z_{02}(k) + Z_{02}\left(\frac{N}{4} - 1 - k\right)\right) \quad (16)$$

for $0 \leq k \leq \frac{N}{2} - 1$ $$Z_{04}(k) = \left(\frac{1}{2j}\exp\left(-j\frac{2\pi(2k+1)}{N}\right)\right)\left(Z_{02}(k) - Z_{02}\left(\frac{N}{4} - 1 - k\right)\right) \quad (17)$$

for $0 \leq k \leq \frac{N}{2} - 1$

Calculating a block of N/2 real numbers $Y_{01}$ from $Z_{03}$ to $Z_{04}$, we obtain:

$$Y_{01}(k) = Re\left(\exp\left(-j\frac{2\pi(2k+1)}{4N}\right)(Z_{03}(k) + Z_{04}(k))\right) \quad (18)$$

for $0 \leq k \leq \frac{N}{2} - 1$

This coincides with $y_0$ defined by equation (1). This may be seen from the following: by substituting equation (14) in equation (15), we get:

$$Z_{02}(k) = \sum_{n=0}^{N/4-1}\left((x_{03}(2n) + jx_{03}(2n + 1))\exp\left(-j\frac{2\pi n}{(N/2)}\right)\right)\exp\left(-j\frac{2\pi kn}{(N/4)}\right) \quad (19)$$

$$= \sum_{n=0}^{N/4-1}(x_{03}(2n) + jx_{03}(2n + 1))\exp\left(-j\frac{2\pi(2k+1)2n}{N}\right)$$

and $$Z_{02}\left(\frac{N}{4} - 1 - k\right) = \sum_{n=0}^{N/4-1}(x_{03}(2n) - jx_{03}(2n + 1))\exp\left(j\frac{2\pi(2(N/4 - 1 - k) + 1)2n}{N}\right) \quad (20)$$

$$= \sum_{n=0}^{N/4-1}(x_{03}(2n) - jx_{03}(2n + 1))\exp\left(-j\frac{2\pi(2k+1)2n}{N}\right)$$

Substituting equations (19) and (20) in equations (16) and (17), we obtain for $Z_{03}$ and $Z_{04}$:

$$Z_{03}(k) = \sum_{n=0}^{N/4-1} x_{03}(2n)\exp\left(-j\frac{2\pi(2k+1)2n}{N}\right) \quad (21)$$

$$z_{04}(k) = \exp\left(-j\frac{2\pi(2k+1)}{N}\right)\sum_{n=0}^{N/4-1} x_{03}(2n + 1)\exp\left(-j\frac{2\pi(2k+1)2n}{N}\right) \quad (22)$$

$$= \sum_{n=0}^{N/4-1} x_{03}(2n + 1)\exp\left(-j\frac{2\pi(2k+1)(2n+1)}{N}\right)$$

Substituting the values of $Z_{03}$ and $Z_{04}$ into equation (18), we obtain for $Y_{01}$:

$$Y_{01}(k) = Re\left(\exp\left(-j\frac{2\pi(2k+1)}{4N}\right)\sum_{n=0}^{N/2-1} x_{03}(n)\exp\left(-j\frac{2\pi(2k+1)n}{N}\right)\right) \quad (23)$$

-continued $$= Re\left(\sum_{n=0}^{N/2-1} x_{03}(n)\exp\left(-j\frac{2\pi(2k+1)(4n+1)}{4N}\right)\right)$$

$$= \sum_{n=0}^{N/2-1} x_{03}(n)\cos\left(\frac{2\pi(2k+1)(4n+1)}{4N}\right)$$

From equations (1) through (4) we obtain:

$$y_0(k) = \sum_{n=0}^{N-1} x_{01}(n)\cos\left(\frac{2\pi(2k+1)(4n+N+2)}{8N}\right) \quad (24)$$

$$= \sum_{n=N/4}^{5N/4-1} x_{01}\left(n-\frac{N}{4}\right)\cos\left(\frac{2\pi(2k+1)\left(4\left(n-\frac{N}{4}\right)+N+2\right)}{8N}\right)$$

$$= \sum_{n=N/4}^{N-1} x_{01}\left(n-\frac{N}{4}\right)\cos\left(\frac{2\pi(2k+1)(2n+1)}{4N}\right) + \sum_{n=N}^{5N/4-1} x_{01}\left(n-\frac{N}{4}\right)\cos\left(\frac{2\pi(2k+1)(2n+1)}{4N}\right)$$

$$= \sum_{n=N/4}^{N-1} x_{01}\left(n-\frac{N}{4}\right)\cos\left(\frac{2\pi(2k+1)(2n+1)}{4N}\right) + \sum_{n=0}^{N/4-1} x_{01}\left(n+\frac{3N}{4}\right)\cos\left(\frac{2\pi(2k+1)(2(n+N)+1)}{4N}\right)$$

$$= \sum_{n=N/4}^{N-1} x_{01}\left(n-\frac{N}{4}\right)\cos\left(\frac{2\pi(2k+1)(2n+1)}{4N}\right) - \sum_{n=0}^{N/4-1} x_{01}\left(n+\frac{3N}{4}\right)\cos\left(\frac{2\pi(2k+1)(2n+1)}{4N}\right)$$

$$= \sum_{n=0}^{N-1} x_{02}(n)\cos\left(\frac{2\pi(2k+1)(2n+1)}{4N}\right)$$

$$= \sum_{n=0}^{N/2-1} x_{02}(2n)\cos\left(\frac{2\pi(2k+1)(4n+1)}{4N}\right) + \sum_{n=0}^{N/2-1} x_{02}(2n+1)\cos\left(\frac{2\pi(2k+1)(2(2n+1)+1)}{4N}\right)$$

$$= \sum_{n=0}^{N/2-1} x_{02}(2n)\cos\left(\frac{2\pi(2k+1)(4n+1)}{4N}\right) + \sum_{m=0}^{N/2-1} x_{02}(N-1-2n)\cos\left(\frac{2\pi(2k+1)(2N-1-4n)}{4N}\right)$$

$$= \sum_{n=0}^{N/2-1} x_{02}(2n)\cos\left(\frac{2\pi(2k+1)(4n+1)}{4N}\right) - \sum_{n=0}^{N/2-1} x_{02}(N-1-2n)\cos\left(\frac{2\pi(2k+1)(-1-4n)}{4N}\right)$$

$$= \sum_{n=0}^{N/2-1} (x_{02}(2n) - x_{02}(N-1-2n))\cos\left(\frac{2\pi(2k+1)(4n+1)}{4N}\right)$$

$$= \sum_{n=0}^{N/2-1} x_{03}(n)\cos\left(\frac{2\pi(2k+1)(4n+1)}{4N}\right)$$

Equations (23) and (24) clarify that $Y_{01}$ coincides with $y_0$ and show that an MDCT may be performed using the method of the present invention.

Since $Z_{02}$ has a period of $N/4$, the calculating process may be performed for values of k from 0 to $(N/4)-1$. An FFT having a length of $N/4$ may be used for this. Additionally, as shown in equation (21), since $Z_{03}$ has a period of $N/4$, the process for calculating equation (16) may simply be carried out for values of k from 0 to $(N/4)-1$. Similarly, as shown in equation (22), since $Z_{04}$ has a period in which only the sign is changed at an interval of $N/4$, the process for calculating equation (17) may simply be carried out for values of k from 0 to $(N/4)-1$. These simplifications enable the calculating process to be carried out more efficiently.

Further, in accordance with the present invention, when performing an IMDCT, the block of $N/4$ complex numbers $Z_{11}$ given by the following equation:

$$Z_{11}(k) = (y_{11}(2k) + jy_{11}(2k+1))\exp\left(-j\frac{2\pi k}{(N/2)}\right) \quad (25)$$

for $0 \leq k \leq \frac{N}{4} - 1$ is determined from $y_{11}$ of equation (9), and the block of $N/2$ complex numbers $Z_{12}$ is calculated in accordance with equation (26):

$$Z_{12}(n) = \sum_{n=0}^{N/4-1} Z_{11}(k)\exp\left(-j\frac{2\pi nk}{(N/4)}\right) \quad (26)$$

for $0 \leq k \leq \frac{N}{2} - 1$

From the block $Z_{12}$, a block of $N/2$ complex numbers $Z_{13}$ and a block of $N/2$ complex numbers $Z_{14}$ are calculated using equations (27) and (28) as follows:

$$Z_{13}(n) = \frac{1}{2}\left(Z_{12}(n) + Z_{12}\left(\frac{N}{4} - 1 - n\right)\right) \quad (27)$$

for $0 \leq k \leq \frac{N}{2} - 1$ $$Z_{14}(n) = \left(\frac{1}{2j} \exp\left(-j\frac{2\pi(2n+1)}{N}\right)\right)\left(Z_{12}(n) - Z_{12}\left(\frac{N}{4} - 1 - n\right)\right) \quad (28)$$

for $0 \leq n \leq \frac{N}{2} - 1$

The block of N/2 real numbers $X_{11}$ is calculated from $Z_{13}$ and $Z_{14}$ in accordance with:

$$X_{11}(n) = Re\left(\exp\left(-j\frac{2\pi(2n+1)}{4N}\right)(Z_{13}(n) + Z_{14}(n))\right) \quad (29)$$

for $0 \leq n \leq \frac{N}{2} - 1$

The block of real numbers $X_{11}$ thus calculated is processed by sign exchange, re-arraying and inverse transform window application to calculate the block of N real numbers $X_{12}$ to obtain:

$$X_{12}(n) = \begin{cases} f(n) X_{11}\left(n + \frac{N}{4}\right) & \text{for } 0 \leq n \leq \frac{N}{4} - 1 \\ -f(n)X_{11}\left(\frac{3N}{4} - 1 - n\right) & \text{for } \frac{N}{4} \leq n \leq \frac{3N}{4} - 1 \\ -f(n)X_{11}\left(n - \frac{3N}{4}\right) & \text{for } \frac{3N}{4} \leq n \leq N - 1 \end{cases} \quad (30)$$

Equation (30) shows that $Y_{12}$ coincides with $x_1$ defined by equation (8) by the following analysis. Substituting equation (25) in equation (25), we obtain the following equations:

$$Z_{12}(n) = \sum_{k=0}^{N/4-1} ((y_{11}(2k) + jy_{11}(2k + 1))\exp\left(-j\frac{2\pi k}{(N/2)}\right))\exp\left(-j\frac{2\pi nk}{(N/4)}\right) \quad (31)$$

$$= \sum_{k=0}^{N/4-1} (y_{11}(2k) + jy_{11}(2k + 1))\exp\left(-j\frac{2\pi(2n+1)2k}{N}\right)$$

$$Z_{12}\left(\frac{N}{4} - 1 - k\right) = \sum_{k=0}^{N/4-1} (y_{11}(2k) - jy_{11}(2k + 1))\exp\left(j\frac{2\pi(2(N/4 - 1 - n) + 1)2k}{N}\right) \quad (32)$$

$$= \sum_{k=0}^{N/4-1} (y_{11}(2k) - jy_{11}(2k + 1))\exp\left(-j\frac{2\pi(2n+1)2k}{N}\right)$$

Substituting equations (31) and (32) in equations (27) and (28), we obtain for $Z_{13}$ and $Z_{14}$:

$$Z_{13}(n) = \sum_{k=0}^{N/4-1} y_{11}(2k)\exp\left(-j\frac{2\pi(2n+1)2k}{N}\right) \quad (33)$$

$$z_{14}(n) = \exp\left(-j\frac{2\pi(2n+1)}{N}\right)\sum_{k=0}^{N/4-1} y_{11}(2k + 1)\exp\left(-j\frac{2\pi(2n+1)2k}{N}\right) \quad (34)$$

$$= \sum_{k=0}^{N/4-1} y_{11}(2k + 1)\exp\left(-j\frac{2\pi(2n+1)(2k+1)}{N}\right)$$

Substituting equations (33) and (34) in equation (29), and using equation (9), we obtain:

$$X_{11}(n) = Re\left(\exp\left(-j\frac{2\pi(2n+1)}{4N}\right)\sum_{k=0}^{N/2-1} Y_{11}(k)\exp\left(-j\frac{2\pi(2n+1)k}{N}\right)\right) \quad (35)$$

$$= Re\left(\sum_{k=0}^{N/2-1} y_{11}(k)\exp\left(-j\frac{2\pi(2n+1)(4k+1)}{4N}\right)\right)$$

$$= \sum_{k=0}^{N/2-1} y_{11}(k)\cos\left(\frac{\pi(2n+1)(4k+1)}{2N}\right)$$

$$= \sum_{k=0}^{N/4-1} y_1(2k)\cos\left(\frac{\pi(2n+1)(4k+1)}{2N}\right) - \sum_{k=N/4}^{N/2-1} y_1(N - 1 - 2k)\cos\left(\frac{\pi(2n+1)(4k+1)}{2N}\right)$$

$$= \sum_{l=0}^{N/4-1} y_1(2l)\cos\left(\frac{\pi(2n+1)(4l+1)}{2N}\right) - \sum_{l=0}^{N/4-1} y_1(2l + 1)\cos\left(\frac{\pi(2n+1)\left(4\left(\frac{N}{2} - 1 - l\right) + 1\right)}{2N}\right)$$

$$= \sum_{l=0}^{N/4-1} y_1(2l)\cos\left(\frac{\pi(2n+1)(2(2l)+1)}{2N}\right) + \sum_{l=0}^{N/4-1} y_1(2l+1)\cos\left(\frac{\pi(2n+1)(2(2l+1)+1)}{2N}\right)$$

$$= \sum_{k=0}^{N/2-1} y_1(k)\cos\left(\frac{\pi(2n+1)(2k+1)}{2N}\right)$$

Applying the relation defined by equation (30) to equation (35), we obtain equations (36), (37), and (38), depending on the value of n:

$$X_{12}(n) = -f(n)X_{11}\left(\frac{3N}{4} - 1 - n\right) \tag{36}$$

$$= -f(n) \sum_{k=0}^{N/2-1} y_1(k)\cos\left(\frac{\pi(2k+1)\left(2\left(\frac{3N}{4} - 1 - n\right) + 1\right)}{2N}\right)$$

$$= f(n) \sum_{k=0}^{N/2-1} y_1(k)\cos\left(\frac{\pi(2k+1)\left(2\left(\frac{3N}{4} - 1 - n\right) + 1\right) - \pi(2k+1)2N}{2N}\right)$$

$$= f(n) \sum_{k=0}^{N/2-1} y_1(k)\cos\left(\frac{\pi(2k+1)\left(-\frac{N}{2} - 1 - 2n\right)}{2N}\right)$$

$$= f(n) \sum_{k=0}^{N/2-1} y_1(k)\cos\left(\frac{\pi(2k+1)\left(2n + \frac{N}{2} + 1\right)}{2N}\right)$$

for $\frac{N}{4} \leq n \leq \frac{3N}{4} - 1$ $$X_{12}(n) = -f(n)X_{11}\left(n - \frac{3N}{4}\right) \tag{37}$$

$$= -f(n) \sum_{k=0}^{N/2-1} y_1(k)\cos\left(\frac{\pi(2k+1)\left(2\left(n - \frac{3N}{4}\right) + 1\right)}{2N}\right)$$

$$= f(n) \sum_{k=0}^{N/2-1} y_1(k)\cos\left(\frac{\pi(2k+1)\left(2\left(n - \frac{3N}{4}\right) + 1\right) + \pi(2k+1)2N}{2N}\right)$$

$$= f(n) \sum_{k=0}^{N/2-1} y_1(k)\cos\left(\frac{\pi(2k+1)\left(2n + \frac{N}{2} + 1\right)}{2N}\right)$$

for $\frac{3N}{4} \leq n \leq N - 1$ $$X_{12}(n) = -f(n)X_{11}\left(n - \frac{3N}{4}\right) \tag{38}$$

$$= -f(n) \sum_{k=0}^{N/2-1} y_1(k)\cos\left(\frac{\pi(2k+1)\left(2\left(n-\frac{3N}{4}\right)+1\right)}{2N}\right)$$

$$= f(n) \sum_{k=0}^{N/2-1} y_1(k)\cos\left(\frac{\pi(2k+1)\left(2\left(n-\frac{3N}{4}\right)+1\right)+\pi(2k+1)2N}{2N}\right)$$

$$= f(n) \sum_{k=0}^{N/2-1} y_1(k)\cos\left(\frac{\pi(2k+1)\left(2n+\frac{N}{2}+1\right)}{2N}\right)$$

for $\frac{3N}{4} \leq n \leq N-1$

Comparing equations (36), (37), and (38) with equation (8) shows that an IMDCT may be performed using the method of the present invention.

Since $Z_{12}$ has a period of N/4, as shown in equation (26), the above calculating process may simply be performed for values of n from 0 to N/4−1. An FFT having a length of N/4 may be used for this. Additionally, as shown in equation (33), since $Z_{13}$ has a period of N/4, the process for calculating equation (27) may simply be carried out for values of n from 0 to N/4−1. Similarly, as shown in equation (34), since $Z_{04}$ has a period in which only the sign is changed at an interval of N/4, the process for calculating equation (28) may simply be carried out for values of n from 0 to N/4−1. These simplifications enable the calculating process to be carried out more efficiently.

It can be seen that, with the apparatus and the method of the present invention, the MDCT defined by the equation (1) and the IMDCT defined by the equation (3) may be calculated using an FFT having a length of N/4. Such an FFT may be executed by N/8 log(N/4) complex number multiplications,
N/4 log(N/4) complex number additions, and
a work area for storing N/4 complex numbers.

This means that the number of the processing operations and the work area may be significantly reduced relative to the conventional method.

In performing the MDCT, the operations for calculating equations (16) to (18) may be combined into equation (39):

$$Y_{01}(k) = \frac{1}{2}\left(\cos\left(\frac{2\pi(2k+1)}{4N}\right)- \right. \tag{39}$$

$$\sin\left(\frac{10\pi(2k+1)}{4N}\right)\right)Re(Z_{02}(k)) + \frac{1}{2}\left(\cos\left(\frac{2\pi(2k+1)}{4N}\right)+ \right.$$

$$\left. \sin\left(\frac{10\pi(2k+1)}{4N}\right)\right)Re\left(Z_{02}\left(\frac{N}{4}-1-k\right)\right)+$$

$$\frac{1}{2}\left(\sin\left(\frac{2\pi(2k+1)}{4N}\right)+\cos\left(\frac{10\pi(2k+1)}{4N}\right)\right)Im(Z_{02}(k))+$$

$$\frac{1}{2}\left(-\sin\left(\frac{2\pi(2k+1)}{4N}\right)+ \right.$$

$$\left.\cos\left(\frac{10\pi(2k+1)}{4N}\right)\right)Im\left(Z_{02}\left(\frac{N}{4}-1-k\right)\right)$$

to find $Y_{01}$ directly from $Z_{02}$.

Additionally, if equation (40):

$$Z_{02}'(k) = \sum_{n=0}^{N/4-1} Z_{01}(n)\exp\left(j\frac{2\pi kn}{N/4}\right) \tag{40}$$

for $0 \leq k \leq \frac{N}{2}-1$ is calculated for an inverse FFT instead of calculating equation (15) using a forward FFT, $Y_{01}$ may be found from $Z_{02}'$, because $Z_{02}'$ can be obtained by re-arraying $Z_{02}$.

The method of the present invention resides in providing the processing for performing an MDCT with an input of N samples using processing equivalent to an FFT having a length of N/4, together with preprocessing and post-processing. Performing the MDCT using equations (39) and (40) is therefore encompassed by the present invention. The same may be said of the processing operations for performing the IMDCT. Thus, the method of executing the processing operations for calculating equations (27) through (30), or of using an IFFT in place of the FFT of equation (26) is encompassed by the present invention.

Figure 2:
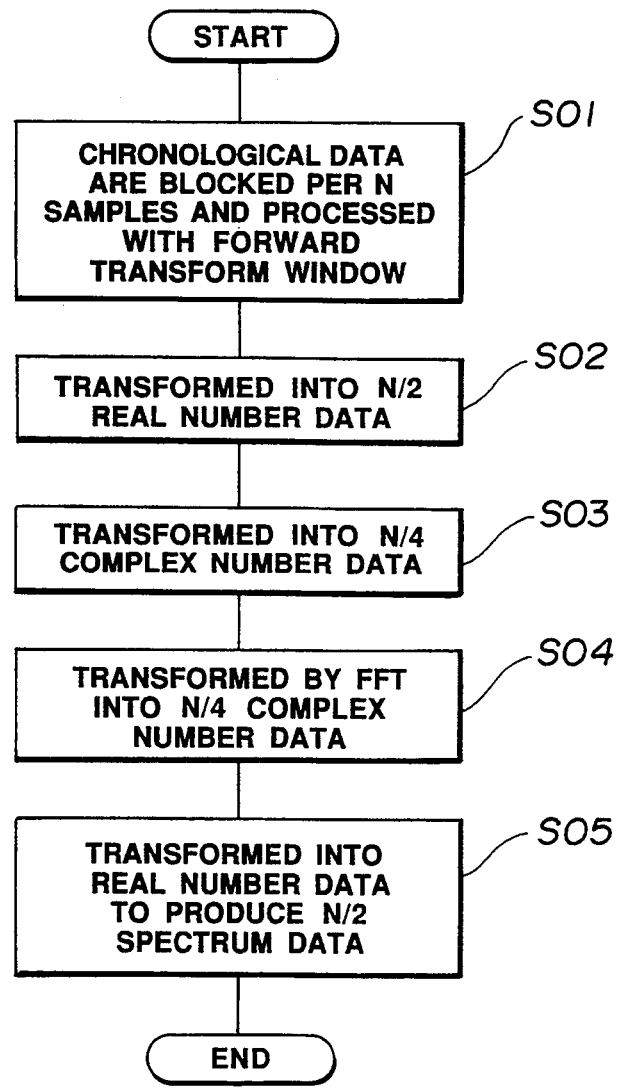
FIG. 2 is a flow chart schematically showing the processing steps of the method of performing an MDCT according to the present invention.

Referring to the drawings, a preferred embodiment of the method according to present invention will next be described. FIG. 2 is a flow chart schematically illustrating the sequence of signal transform operations in the method for performing an MDCT according to the present invention.

In the first step S01 of FIG. 2, sample data in the time domain, such as PCM audio data, is divided into blocks. Each block consists of a predetermined number of samples. In the example shown in FIG. 2, each block consists of N samples. The blocks are arranged such that there is a 50% overlap between adjacent blocks, i.e., adjacent blocks are overlapped by N/2 samples, as shown in FIG. 1. The block of N samples $x_0$ is multiplied by the forward transform window Wh, as shown in FIG. 1, to provide a block of N windowed samples $x_{01}$.

In the next step, S02, the block of N windowed samples $x_{01}$ is converted by the transform defined by equation (4) into a block of N/2 real numbers $x_{03}$.

In the next step S03, the even-numbered elements and the odd-numbered elements of $x_{03}$ are allocated to real and imaginary parts, respectively, of a block of N/4 complex numbers. The resulting complex numbers are then multiplied by the complex coefficient shown in equation (14) to convert them into the block of N/4 complex numbers $Z_{01}$.

In the next step S04, $Z_{01}$ is processed by an FFT to produce: the block of N/4 complex numbers $Z_{02}$ in the frequency domain.

In the next step S05, the block of complex numbers $Z_{02}$ is processed in accordance with equations (16) through (18) to provide the block of N/2 spectral coefficients $Y_{01}$, which are the output of the MDCT.

Figure 3:
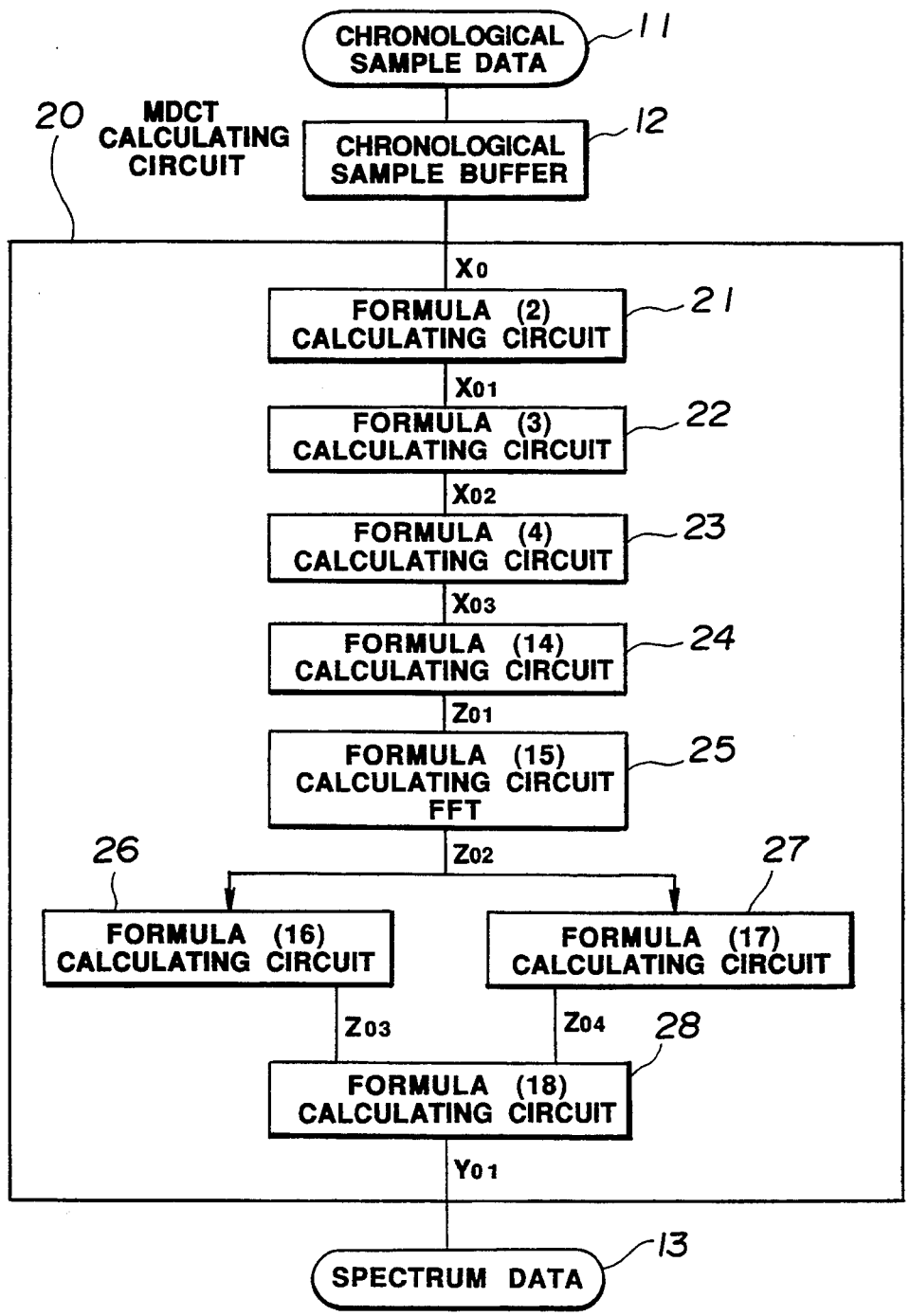
FIG. 3 is a functional block diagram of an apparatus according to the invention for implementing the method of performing an MDCT shown in FIG. 2.

FIG. 3 shows a typical hardware arrangement according to the invention for carrying out the method of performing an MDCT according to the invention. A block of sample data in the time domain stored in a time domain sample buffer is converted into spectral coefficients in the frequency domain by the MDCT processing circuit according to the invention.

The circuit shown in FIG. 3 can be realized using discrete circuitry, or multiple microprocessors. Preferably, however, the majority of processing operations are performed using an appropriately programmed digital signal processor circuit and auxiliary memories.

In FIG. 3, samples in the time domain, such as a PCM audio signal, are supplied to the input terminal 11, whence they pass into the time domain sample buffer 12. In the time domain sample buffer, the samples are divided into blocks of a predetermined number of samples, for example, into blocks of N samples. The blocks of N samples are then supplied to the MDCT processing circuit 20.

The MDCT processing circuit 20 includes an equation (2) calculating circuit 21, an equation (3) calculating circuit 22, an equation (4) calculating circuit 23, an equation (14) calculating circuit 24, and an equation (15) calculating circuit 25 for calculating the equations (2), (3), (4), (14), and (15), respectively. The calculated results from the equation (15) calculating circuit 25 are supplied to both the equation (16) calculating circuit 26 and to the equation (17) calculating circuit 27. Outputs $Z_{03}$ from the equation (16) calculating circuit 26 and $Z_{04}$ from the equation (17) calculating circuit 27 are supplied to the equation (18) calculating circuit 28, which calculates $Y_{01}$, and provides $Y_{01}$ to the output terminal 13.

Figure 4:
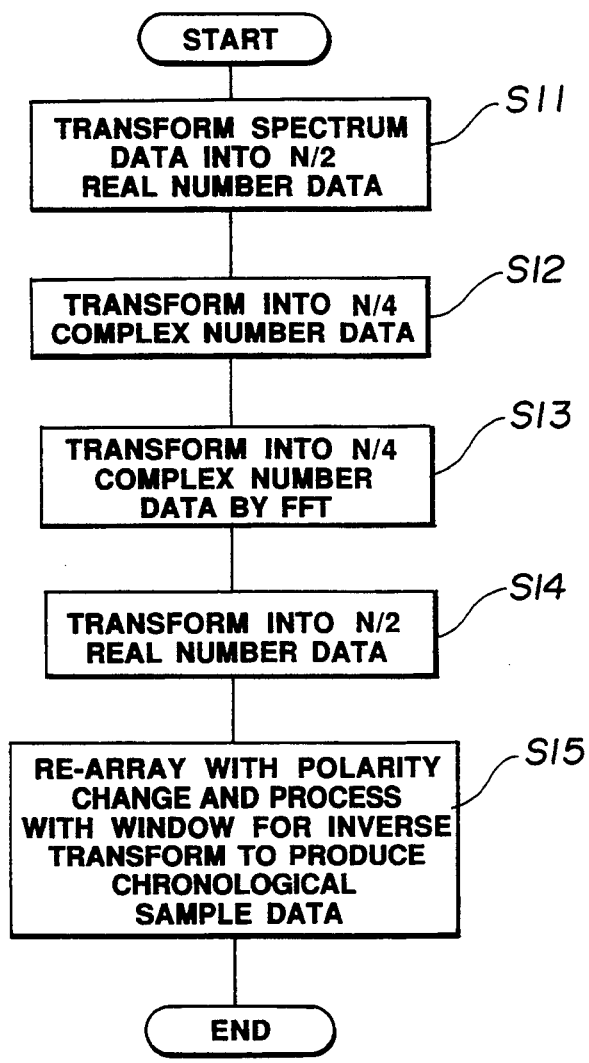
FIG. 4 is a flow chart schematically showing the processing steps of the method of performing an IMDCT according to the present invention.

FIG. 4 is a flow chart schematically showing the sequence of signal processing for carrying out the method of performing an IMDCT according to the present invention.

In the first step S11 in FIG. 4, a block of N/2 spectral coefficients $y_1$ are processed by sign changing and re-arraying, as shown in equation (9), and are converted into the block of N/2 real numbers $y_{11}$.

In the next step S12, the even-numbered elements and the odd-numbered elements of $y_{11}$ are allocated to real and imaginary parts, respectively, of a block of N/4 complex numbers. The block of N/4 complex numbers is then multiplied by the complex coefficient shown in equation (25) to provide the block of N/4 complex numbers $Z_{11}$.

In the next step S13, $Z_{11}$ is processed by an FFT to produce the block of N/4 complex numbers $Z_{12}$ in the frequency domain.

In the next step S14, $Z_{12}$ is processed in accordance with equations (27) through (29) to produce the block of N/2 real numbers $X_{11}$.

In the next step S15, the block of N/2 real numbers $X_{11}$ is processed by sign change, rearraying, and inverse transform window multiplication in accordance with equation (30) to produce the block of N real numbers $X_{12}$, from which samples of an output signal in the time domain can be derived.

Figure 5:
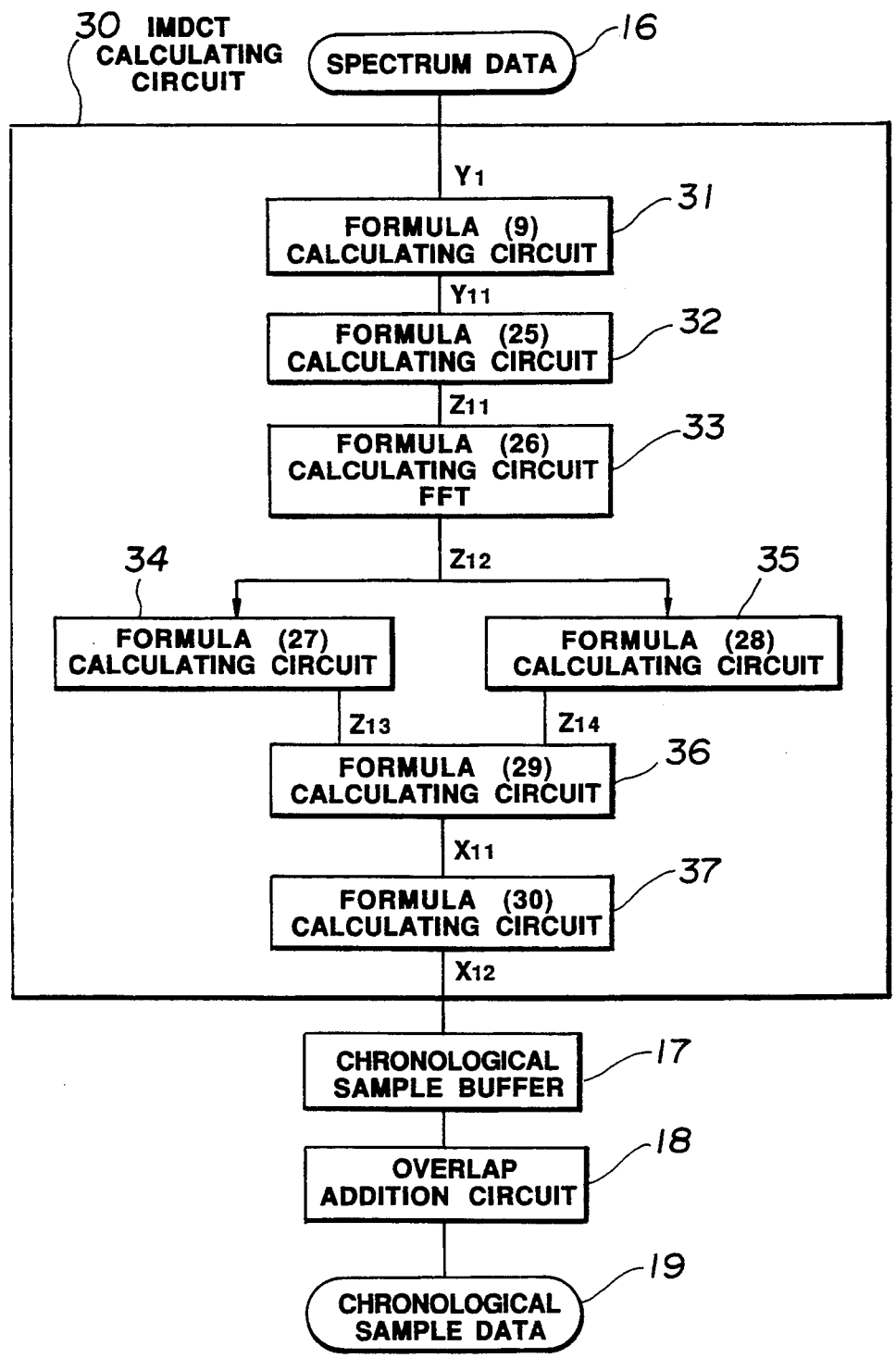
FIG. 5 is a functional block diagram of an apparatus according to the invention for implementing the method of performing an IMDCT shown in FIG. 4.

FIG. 5 shows a typical hardware arrangement according to the invention for carrying out the method according to the invention of performing an IMDCT transform, and for constructing a digital output signal in the time domain.

The circuit shown in FIG. 5 can be realized using discrete circuitry, or multiple microprocessors. Preferably, however, the majority of the processing operations are performed using an appropriately programmed digital signal processor circuit and auxiliary memories. The digital signal processor used for the circuit shown in FIG. 3 can be reprogrammed to provide the processing operations of the circuit shown in FIG. 5.

In the circuit shown in FIG. 5, the block of N/2 spectral coefficients $y_1$, resulting from an MDCT, is supplied to the input terminal 16. Normally, the block of spectral coefficients $y_1$ will have been derived from a compressed digital signal reproduced from a storage medium, such as a magneto-optical disk, or from a transmission medium.

From the input terminal, the block of spectral coefficients $y_1$ is supplied to the equation (9) calculating circuit 31 of the IMDCT calculating circuit 30. The output of the equation (9) calculating circuit 31 is supplied via the equation (25) calculating circuit 32 to the equation (26) calculating circuit 33. The output $Z_{12}$ from the equation (26) calculating circuit 33 is supplied to both the equation (27) calculating circuit 34 and the equation (27) calculating circuit 35. The outputs from the equation (27) calculating circuit 34 and the equation (28) calculating circuit 35 are supplied to the equation (29) calculating circuit 36 which provides an output $X_{11}$ to the equation (30) calculating circuit 37. The output, $X_{12}$, from the equation (30) calculating circuit 37 is provided as the output of the IMDCT calculating circuit 30.

The output of the IMDCT calculating circuit 30, the block of N real numbers $X_{12}$ is supplied to the overlap and add circuit 18 via the time domain sample buffer 17. Adjacent blocks of samples in the time domain data are overlapped by N/2 samples, and are added together to provide an output signal consisting of samples in the time domain.

Figure 6:
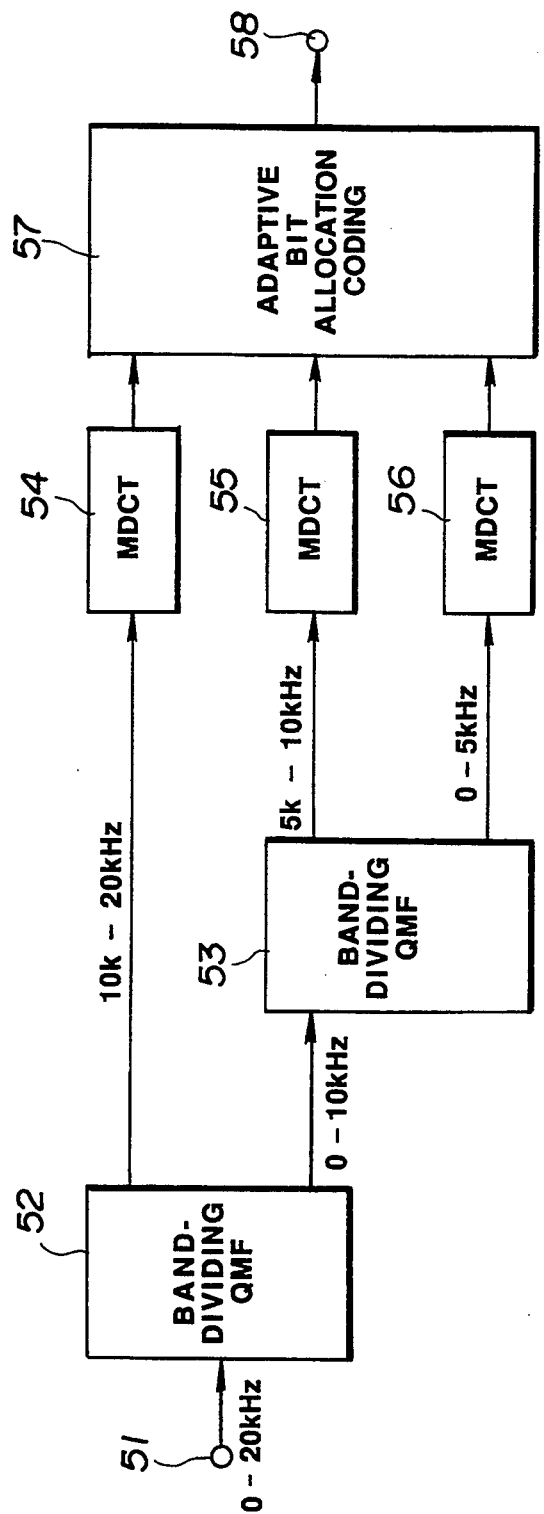
FIG. 6 is a block diagram showing an example of a circuit arrangement of a high efficiency encoding apparatus to which the apparatus and method for performing an MDCT according to the invention is applied.

FIG. 6 shows a practical example of a high efficiency coding apparatus in which the method and apparatus for performing an MDCT is applied. The high efficiency coding apparatus shown in FIG. 6 uses the techniques of sub-band coding, adaptive transform coding, and adaptive bit allocation.

A digital input signal, such as a digital PCM audio signal, is divided in frequency into a frequency range signal in each of plural frequency ranges. The bandwidths of the frequency ranges broaden in the direction of increasing frequency. An MDCT is performed on the frequency range signal in each of the frequency ranges independently. The resulting spectral coefficients in the frequency domain are grouped into critical bands, and the spectral coefficients in each critical band are coded by adaptive bit allocation.

In FIG. 6, an audio PCM input signal in the frequency range of, e.g., 0 Hz to 20 kHz are supplied to the input terminal 51. The band dividing filter 52, which is preferably a Quadrature Mirror Filter (QMF), divides the input signal in frequency into a 0 Hz to 10 kHz frequency range, and a 10 to 20 kHz frequency range. A second QMF 53 divides the 0 Hz to 10 kHz frequency range in frequency into a 0 Hz to 5 kHz frequency range and a 5 to 10 kHz frequency range. The 10 to 20 kHz frequency range signal is transmitted from the QMF 52 to the modified discrete cosine transform circuit (MDCT circuit) 54. The 5 to 10 kHz frequency range signal from the QMF 53 is transmitted to the MDCT circuit 55, and the 0 Hz to 5 kHz frequency range signal from the QMF 53 is transmitted to the MDCT circuit 56. The MDCT circuits 54, 55, and 56 embody the method and apparatus according to the invention.

The spectral coefficients in the frequency domain, resulting from orthogonally transforming the three frequency range signals using the MDCT circuits 54, 55, and 56, are grouped into critical bands and supplied to the adaptive bit allocation circuit 57. Grouping the spectral coefficients into critical bands enables the masking characteristics of the human auditory sense to be taken into account.

Bits are allocated to the spectral coefficients in a way that takes advantage of a psychoacoustic property of the human auditory sense called "masking." Masking is a psychoacoustic phenomenon in which a sound is rendered inaudible, or "masked," by other sounds occurring simultaneously with, or slightly earlier than, or later than, the sound. Masking effects may be classed into time domain masking effects, that is, masking by sounds occurring earlier or later than the masked sound, and concurrent masking effects, which is masking is by simultaneously-occurring sounds having a frequency different from the frequency of the masked sound.

Masking enables a sound to render inaudible any noise within its time or frequency masking range. This means that, in the presence of a signal that, when reproduced, produces a sound, a digital coding system may produce a quantizing noise level that is high compared with the noise level that is allowable in the absence of the signal, provided that the quantizing noise lies within the masking range of the sound produced by the signal. Since relatively high levels of quantizing noise are allowable if masked by the sound resulting from the signal, the number of bits required to quantize the signal representing the sound, or parts of the signal, may be significantly reduced.

A critical band is a frequency band that takes advantage of the masking characteristics of the human auditory sense. A critical band is the band of noise that can be masked by a pure sound that has the same intensity as the noise and has a frequency in the vicinity of the frequency of the noise. The width of the critical band increases with increasing frequency of the pure sound. The entire audio frequency range of 0 Hz to 20 kHz can be divided into, for example, 25 critical bands.

In the adaptive bit allocation coding circuit 57, the spectral coefficients are first normalized by applying block floating to the spectral coefficients in each critical band. A block floating coefficient, e.g., the maximum of the absolute values of the spectral coefficients in the critical band, is determined for each critical band. The spectral coefficients in each critical band are then normalized using the block floating coefficient. The normalized spectral coefficients in each critical band are then re-quantized using a number of bits that is large enough to provide a quantizing noise level that is low enough to be masked by the signals in the critical band and neighbouring critical bands. The output signal provided to the output terminal 58 comprises the adaptively quantized spectral coefficients, together with the block floating coefficient for each critical band, and word length data indicating the number of bits used for coding the spectral coefficients in each critical band. The output signal can then be transmitted or recorded on a suitable recording medium for later reproduction and decoding. Examples of suitable recording media are magneto-optical disks, optical disks, magnetic tapes, and semiconductor memories.

Figure 7:
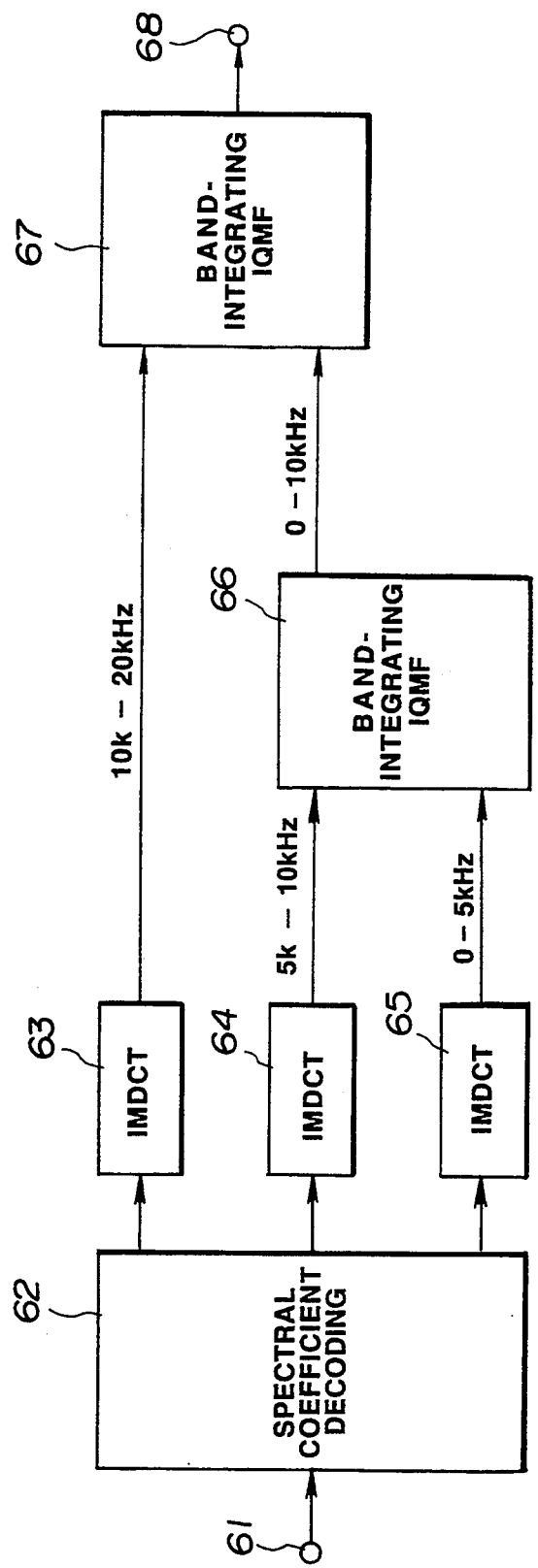
FIG. 7 is a block diagram showing an example of a circuit arrangement of a high efficiency decoding apparatus to which the apparatus and method for performing an IMDCT according to the invention is applied.

FIG. 7 shows a decoding apparatus complementary to the high efficiency coding apparatus shown in FIG. 6. The decoding apparatus includes IMDCT circuits to which the IMDCT apparatus and method according to the invention is applied. Compressed digital data, which is normally reproduced from a storage medium, such as a magneto-optical disk, an optical disk, a magnetic tape, or a semiconductor memory, or a transmission medium, is fed into the terminal 61. The compressed digital data includes a block floating coefficient for each critical band, word length data indicating the number of bits used for coding each critical band, and adaptively quantized spectral coefficients. Blocks of spectral coefficients are constructed from this data by a spectral coefficient decoding circuit 62.

The spectral coefficients in each block are grouped into the spectral coefficients for the 10 to 20 kHz frequency range, the spectral coefficients for the 5 to 10 kHz frequency range, and the spectral coefficients for the 0 Hz to 5 kHz frequency range for feeding into the IMDCT circuits 63, 64 and 65, respectively. The IMDCT circuits 63, 64, and 65, which employ the IMDCT processing method and apparatus according to the invention, transform the groups of spectral coefficients in the frequency domain into three frequency range signals in the time domain.

Of the frequency range signals obtained as just described, the 0 Hz to 5 kHz frequency range signal and the 5 to 10 kHz frequency range signal waveform are first combined by the band combining circuit 66 into a 0 Hz to 10 kHz frequency range signal. The 0 Hz to 10 kHz frequency range signal is combined with the 10 to 20 kHz frequency range signal in the band combining circuit 67. The resulting full frequency range signal is provided supplied to the output terminal 68.

It is to be noted that the present invention is not limited to the above described embodiments. For example, the present invention is not limited to use in the high efficiency coding and decoding apparatus shown in FIGS. 6 and 7, but may be applied to a variety of transform coding apparatus or decoding devices.

It is seen from above that the present invention provides a high efficiency coding apparatus for audio signals in which a block of N time domain samples data overlapped 50% with a preceding and a subsequent block may be efficiently orthogonally transformed using a forward modified DCT (MDCT) which uses a Fast Fourier Transform (FFT) with a length of N/4. This significantly reduces the number of processing operations and the work area required.

The present invention also provides a decoding apparatus and method in which N/2 independent spectral coefficients are processed by an inverse modified DCT (MDCT) which uses a FFT with a length of N/4. This also significantly reduces the number of processing operations and the work area required.

I claim:

1. A forward transform processing apparatus for carrying out a modified discrete cosine transform on a digital input signal, the digital input signal comprising plural samples in the time domain, the apparatus comprising:
   (1) means for dividing the digital input signal blocks of N samples, where N is a positive multiple of four;
   (2) a multiplier, the multiplier multiplying each block of N samples by a forward transform window to provide a block of N forward transform window processed samples; and
   (3) transform means for transforming the block of N forward transform window processed samples to provide a block of N/2 spectral coefficients, the transform means including:
      (a) a preprocessing means for preprocessing the block of N forward transform window processed samples to provide a block of N/4 complex numbers,
      (b) an FFT means for performing processing equivalent to a Fast Fourier Transform on the block of N/4 complex numbers to provide a transformed block of N/4 complex numbers; and
      (c) a postprocessing means for post-processing the transformed block of complex numbers to provide the block of N/2 spectral coefficients.

2. The forward transform processing apparatus of claim 1, where:
   (1) the block of N forward transform window processed samples includes an n-th sample, a (n+3N/4)-th sample, the (n+3N/4)-th sample having a signal, and a (n−N/4)-th sample, wherein n is an integer between 0 and (N−1); and
   (2) the preprocessing means includes:
      (a) a first deriving means for deriving, from the block of N forward transform window processed samples, a block of first intermediate samples, the block of first intermediate samples including an n-th a (N−1−2n)-th, and a 2n-th first intermediate sample, the first deriving means deriving the block of first intermediate samples by:
         (i) reversing the sign of the (n+3N/4)-th sample to provide a sign-reversed (N+3N/3)-th sample, and providing the sign-reversed (n+3N/4)-th sample as the n-th first intermediate sample, for each integral value of n from 0 to N/4−1, and
         (ii) providing the (n−N/4)-th sample as the nth first intermediate sample, for each integral value of n from N/4 to N−1,
      (b) a second deriving means for deriving, from the block of first intermediate samples, a block of second intermediate samples, the block of second intermediate samples including an n-th, a 2n-th, and a (2n+1)-th second intermediate sample, the second deriving means deriving the block of second intermediate samples by subtracting, for each integral value of n from 0 to N/2−1, the (N−1−2N)-th first intermediate sample from the 2n-th first intermediate sample to provide the n-th second intermediate sample;

(c) a third deriving means for deriving, from the block of second intermediate samples, the block of N/4 complex numbers, the complex numbers in the block of N/4 complex numbers each having a real part and an imaginary part, and including an n-th complex number, the third deriving means deriving the block of N/4 complex numbers by:
         (i) selecting the 2n-th second intermediate sample as a real part of an n-th intermediate complex number,
         (ii) selecting the (2n+1)-th second intermediate sample as an imaginary part of the n-th intermediate complex number, and
         (iii) multiplying the n-th intermediate complex number by an exponential of $(-4\pi jn/N)$ to provide the n-th complex number in the block of N/4 complex numbers,
      for each integral value of n from 0 to N/4−1.

3. The forward transform processing apparatus of claim 1, wherein:
   (1) the block of N/2 spectral coefficients includes a k-th spectral coefficient, where k is an integer between 0 and N/2−1, and
   (2) the post-processing means includes:
      (a) a means for expanding the transformed block of N/4 complex numbers based on periodicity to provide a block of 3N/4 complex numbers, the block of 3N/4 complex numbers including a k-th complex number and a (N/4−1−k)-th complex number,
      (b) a means for deriving a (N/4−1−k)-th complex conjugate from the (N/4−1−k)-th complex number,
      (c) a means for:
         (i) summing the (N/4−1−k)-th complex conjugate and the k-th complex number to provide a sum, and
         (ii) dividing the sum by two to provide a k-th third intermediate complex number,
      (d) a means for
         (i) subtracting the (N/4−1−k)-th complex conjugate from the k-th complex number to provide a difference,
         (ii) dividing the difference by 2j to provide a quotient, where j is the square root of minus one, and
         (iii) multiplying the quotient by the exponential of $(-2\pi/(2k+1)/N)$ to provide a k-th fourth intermediate complex number, and
      (e) a means for
         (i) summing the k-th third intermediate complex number and the k-th fourth intermediate complex number to provide a k-th fifth intermediate complex number, and
         (ii) multiplying the k-th fifth intermediate complex number of an exponential of $(-\pi j(2k+1)(2N))$ to provide a k-th sixth intermediate complex number having a real part and an imaginary part, and
         (iii) providing the real part of the k-th sixth intermediate complex number sum as the k-th spectral coefficient.

4. The forward transform processing apparatus of claim 1, wherein:
   (1) the block of N/2 spectral coefficients includes a k-th spectral coefficient, where k is an integer between 0 and N/2−1, and (2) the post-processing means includes:
  (a) a means for expanding the transformed block of N/4 complex numbers based on periodicity to provide a block of 3N/4 complex numbers, the complex numbers in the block of 3N/4 complex numbers having a real part and an imaginary part, and including a k-th complex number and a (N/4−1−k)-th complex number;
  (b) a means for determining
    (i) a sum, the sum being one half of a sum of the cosine of $(2\pi)(2k+1)/4N)$ and sine of $(10\pi)(2k+1)/4N)$,
    (ii) a first difference, the first difference being one half of a difference between the cosine of $(2\pi(2k+1)/4N)$ and the sine of $(10\pi(2k+1)/4N)$, and
    (iii) a second difference, the second difference being one half of a difference between and sine of $(10\pi(2k+1)/4N)$ and the cosine of $(2\pi(2k+1)/4N)$;
  (c) a means for multiplying:
    (i) the real part of the k-th complex number by the first difference to provide a first intermediate number,
    (ii) the real part of the (N/4−1−k)-th complex number by the sum, to provide a second intermediate number,
    (iii) the imaginary part of the k-th complex number by the sum to provide a third intermediate number, and
    (iv) the imaginary part of the (N/4−1−k)-th complex number by the second difference to provide a fourth intermediate number; and
  (d) means for summing the first, the second, the third, and the fourth intermediate numbers to provide the k-th spectral coefficient.

5. An inverse transform processing apparatus for carrying out a inverse modified discrete cosine transform on spectral coefficients in the frequency domain to provide a digital output signal in the time domain, the apparatus comprising:
  (1) means for dividing the spectral coefficients into blocks of N/2 spectral coefficients, where N is a multiple of 4;
  (2) inverse transform means for inversely transforming each block of N/2 spectral coefficients to provide a block of N/2 processed samples in the time domain, the inverse transform means including:
    (a) a pre-processing means for pre-processing the spectral coefficients in the block of N/2 spectral coefficients to provide a block of N/4 frequency domain complex numbers,
    (b) an FFT means for performing processing equivalent to a Fast Fourier Transform on the block of N/4 frequency domain complex numbers to provide a block of N/4 time domain complex numbers, and
    (c) a post-processing means for post-processing the block of N/4 time domain complex numbers to provide the block of N/2 processed samples in the time domain;
  (3) a means for re-arraying the block of N/2 processed samples in the time domain to provide a block of N samples in the time domain;
  (4) a multiplier, the multiplier multiplying the block of N samples in the time domain by an inverse transform window to provide a windowed block of N samples in the time domain;
  (5) means for providing successive windowed blocks of N samples in the time domain as the digital output signal.

6. The inverse transform processing apparatus of claim 5, wherein:
  (1) the block of N/2 spectral coefficients includes a 2-th, and a (N−1−2k)-th spectral coefficient, each having a sing, where k is an integer between 0 and (2N−1),
  (2) the block of N/4 frequency domain complex numbers includes a k-th frequency domain complex number, and
  (3) the pre-processing means includes:
    (a) a first deriving means for deriving, from the block of N/2 spectral coefficients, a block of first intermediate numbers, the first intermediate numbers including a k-th, a 2k-th, and a (2k+1)-th first intermediate number, the first deriving means deriving the first intermediate numbers by:
      (i) selecting the 2k-th spectral coefficient as the k-th first intermediate number for each integral value of k between 0 and N/4−1, and
      (ii) reversing the sign of the (N−1−2k)-th spectral coefficient to provide a sign-reversed (N−1−2k)-th spectral coefficient, and providing the sign-reversed (N−1−2k)-th spectral coefficient as the k-th first intermediate number for each integral value of k between N/4 to N/2−1, and
    (b) a second deriving means for deriving, from the block of N/2 first intermediate numbers, the block of N/4 frequency domain complex numbers, the frequency domain complex numbers having a real part and an imaginary part, and including a k-th frequency domain complex number, the second deriving means deriving the block of N/4 frequency domain complex numbers by:
      (i) selecting the 2k-th first intermediate number as a real part of a k-th complex number,
      (ii) selecting the (2k+1)-th first intermediate number as an imaginary part of the k-th complex number, and
      (iii) multiplying the k-th complex number by an exponential of $(-4\pi jk/N)$ to provide the k-th frequency domain complex number,
  for each integral value of k between 0 and N/4−1.

7. The inverse transform processing apparatus of claim 5, wherein:
  (1) block of N/2 processed samples includes an n-th processed sample, where n is an integer between 0 and N/2−1, and
  (2) the post-processing means includes:
    (a) a means for expanding the block of N/4 time domain complex numbers based on periodicity to provide a block of 3N/4 complex numbers, the block of 3N/4 complex numbers including an n-th complex number and a (N/4−1−n)-th complex number,
    (b) a means for deriving a (N/4−1−n)-th complex conjugate from the (N/4−1−n)-th complex number,
    (c) a means for
      (i) summing the (N/4−1−n)-th complex conjugate and the n-th complex number to provide a first sum, and (ii) dividing the first sum by two to provide an n-th third intermediate complex number, (d) a means for
  (i) subtracting the (N/4−1−n)-th complex conjugate from the n-th complex number to provide a difference,
  (ii) dividing the difference by 2j to provide a quotient, where j is the square root of minus one, and
  (iii) multiplying the quotient by the exponential of (2πj(2n+1)/N) to provide an n-th fourth intermediate complex number, and (e) a means for
  (i) summing the n-th third intermediate complex number and the n-th fourth intermediate complex number to provide an n-th fifth intermediate complex number,
  (ii) multiplying the n-th fifth intermediate complex number by an exponential of (−π(2n+1)(2N)) to provide an n-th sixth intermediate complex number having a real part and an imaginary part, and
  (iii) providing the real part of the n-th sixth intermediate complex number as the n-th processed sample.

8. The inverse transform processing apparatus of claim 5, wherein:
  (1) the block of N/2 processed samples includes an (n+N/4)-th, an (3N/4−1−n)-th, and an (n−3N/4)-th processed sample, each processed sample having a sign,
  (2) the block of N samples in the time domain includes an n-th sample in the time domain, and
  (3) the means for multiplying the block of N/2 processed samples in the time domain by an inverse transform window includes:
    (a) a deriving means for deriving from the block of N/2 processed samples, the block of N intermediate processed samples, the block of N intermediate processed samples including an n-th intermediate processed sample, the deriving means deriving the block of N intermediate processed samples by:
      (i) selecting the (n+N/4)-th processed sample as the n-th intermediate processed sample for each integral value of n from 0 to N/4−1,
      (ii) reversing the sign of the (3N/4−1−n)-th processed sample to provide a sign-reversed (3N/4−1−n)-th processed sample, and providing the sign-reversed (3N/4−1−n)-th processed sample as the n-th intermediate processed sample for each integral value of n from N/4 to 3N/4−1, and
      (iii) reversing the sign of the (n−3N/4)-th processed sample to provide a sign-reversed (n−3N/4)-th processed sample, and providing the sign-reversed (n−3N/4)-th processed sample as the n-th intermediate processed sample for each integral value of n from 3N/4 to N−1; and
    (b) a means for multiplying the n-th intermediate processed sample by an inverse transform window for the n-th intermediate processed sample, for each integral value of n from 0 to N−1, to provide the n-th sample in the time domain.

9. A method of performing a simplified digital spectral analysis of a block of N samples representing an information signal in the time domain, the spectral analysis providing a block of N/2 spectral coefficients representing the information signal in the frequency domain, the method comprising the steps of:
  (1) multiplying the block of N samples representing the information signal in the time domain by a forward transform window to provide a block of N forward transform window processes samples;
  (2) digitally preprocessing the block of N forward transform window processed samples to provide a block of N/4 complex numbers;
  (3) performing digital processing equivalent to a Fast Fourier Transform on the block of N/4 complex numbers to provide a transformed block of N/4 complex numbers; and
  (4) digitally post-processing the transformed block of complex numbers to provide the block of N/2 spectral coefficients representing the information signal in the frequency domain.

10. The method of claim 9, wherein:
  (1) in the step of multiplying the block of N samples, the block of N forward transform window processed samples includes an n-th sample, a (n+3N/4)-th sample, the (n+3N/4)-th sample having a sign, and a (n−N/4)-th sample, where n is an integer between 0 and (N−1); and
  (2) the step of digitally preprocessing the block of N forward transform window processed samples includes the steps of:
    (a) deriving, from the block of N forward transform window processed samples, a block of first intermediate samples, the block of first intermediate samples including an n-th, a (N−1−2n)-th, and a 2n-th first intermediate sample, the block of first intermediate samples being derived by steps including:
      (i) reversing the sing of the (n+3N/4)-th sample to provide a sign-reversed (n+3N/4)-th sample, and providing the sign-reversed (n+3N/4)-th sample as the n-th first intermediate sample, for each integral value of n from 0 to N/4−1, and
      (ii) providing the (n−3N/4)-th sample as the nth first intermediate sample, for each integral value of n from N/4 to n−1,
    (b) deriving, from the block of first intermediate samples, a block of second intermediate samples, the block of second intermediate samples including an n-th, a 2n-th, and a (2n+1)-th second intermediate sample, the block of second intermediate samples being derived by steps including subtracting, for each integral value of n from 0 to N/2−1, the (N−1−2N)-th first intermediate sample from the 2n-th first intermediate sample to provide the n-th second intermediate sample,
    (c) deriving, from the block of second intermediate samples, the block of N/4 complex numbers, the complex numbers in the block of N/4 complex numbers each having a real part and an imaginary part, and including an n-th complex number, the block of N/4 complex numbers being derived by steps including:
      (i) selecting the 2n-th second intermediate sample as real part of the n-th intermediate complex number,
      (ii) selecting the (2n+1)-th second intermediate sample as an imaginary part of the n-th intermediate complex number, and (iii) multiplying the n-th intermediate complex number by the exponent of $(-3\pi jn/N)$ to provide the n-th complex number in the block of N/4 complex numbers, for each integral value of n from 0 to $N/4-1$.

11. The method of claim 9, wherein:

(1) in the step of post-processing the transformed block of complex numbers, the block of N/2 spectral coefficients includes a k-th spectral coefficient, where k is an integer between 0 and $N/2-1$, and (2) the step of post-processing the transformed block of complex numbers includes the steps of:

(a) expanding the transformed block of N/4 complex numbers based on periodicity to provide a block of 3N/4 complex numbers, the block of 3N/4 complex numbers including a k-th complex number and a $(N/4-1-k)$-th complex number, (b) deriving a $(N/4-1-k)$-th complex conjugate from the $(N/4-1-k)$-th complex number, (c) deriving the k-th third intermediate complex number by (i) summing the $(N/4-1-k)$-th complex conjugate and the k-th complex number to provide a sum, and (ii) dividing the sum by two to provide the k-th third intermediate complex number, (d) deriving a k-th fourth intermediate complex number by (i) subtracting the $(N/4-1-k)$-th complex conjugate from the k-th complex number to provide a difference, (ii) dividing the difference by 2j to provide a quotient, where j is the square root of minus one, and (iii) multiplying the quotient by the exponential of $(-2\pi j(2k+1)/N)$ to provide the k-th fourth intermediate complex number, (e) deriving the k-th spectral coefficient by (i) summing the k-th third intermediate complex number and the k-th fourth intermediate complex number to provide a k-th fifth intermediate complex number, (ii) multiplying the k-th fifth intermediate complex number by an exponential of $(-\pi j(2k+1)(2N))$ to provide a k-th sixth intermediate complex number having a real part and an imaginary part, and (iii) providing the real part of the k-th sixth intermediate complex number sum as the k-th spectral coefficient.

12. The method of claim 9, wherein:

(1) in step of post-processing the transformed block of complex numbers, the block of N/2 spectral coefficients includes a k-th spectral coefficient, where k is an integer between 0 and $N/2-1$, and (2) step of post-processing the transformed block of complex numbers includes the steps of:

(a) expanding the transformed block of N/4 complex numbers based on periodicity to provide a block of 3N/4 complex numbers, the complex numbers in the block of 3N/4 complex numbers having a real part and an imaginary part, and including a k-th complex number and a $(N/4-1-k)$-th complex number;

(b) determining:

(i) a sum, the sum being one half of a sum of the cosine of $(2\pi)(2k+1)/4N$ and sine of $(10\pi)(2k+1)/4N$, (ii) a first difference, the first difference being one half of a difference between the cosine of $(2\pi)(2k+1)/4N$ and the sine of $(10\pi)(2k+1)/4N$, and (iii) a second difference, the second difference being one half of a difference between and sine of $(10\pi)(2k+1)/4N$ and the cosine of $(2\pi)(2k+1)/4N$;

(c) multiplying:

(i) the real part of the k-th complex number by the first difference to provide a first intermediate number, (ii) the real part of the $(N/4-1-k)$-th complex number by the sum, to provide a second intermediate number, (iii) the imaginary part of the k-th complex number by the sum to provide a third intermediate number, and (iv) the imaginary part of the $(N/4-1-k)$-th complex number by the second difference to provide a fourth intermediate number; and (d) summing the first, the second, the third, and the fourth intermediate numbers to provide the k-th spectral coefficient.

13. A method of performing a simplified digital temporal analysis of a block of N/2 spectral coefficients representing an information signal in the frequency domain, the temporal analysis providing a block of N samples representing the information signal in the time domain, the method comprising the steps of:

(1) digitally pre-processing the block of N/2 spectral coefficients representing the information signal in the frequency domain to provide a block of N/4 frequency domain complex numbers, where N is a multiple of 4;

(2) performing digital processing equivalent to a Fast Fourier Transform on the block of N/4 frequency domain complex numbers to provide a block of N/4 time domain complex numbers;

(3) digitally post-processing the block of N/4 time domain complex numbers to provide a block of N/2 processed samples in the time domain; and (4) digitally re-arraying and multiplying the block of N/2 processed samples in the time domain by an inverse transform window to provide the block of N samples representing the information signal in the time domain.

14. The method of claim 13, wherein:

(1) the block of N/2 spectral coefficients includes a 2k-th, and a $(N-1-2k)$-th spectral coefficient, each having a sign, (2) the block of N/4 frequency domain complex numbers includes a k-th frequency domain complex number, and (3) the step of pre-processing the spectral coefficients in the block of N/2 spectral coefficients to provide a block of N/4 frequency domain complex numbers includes the steps of:

(a) deriving, from the block of N/2 spectral coefficients, a block of first intermediate numbers, the first intermediate numbers including a k-th, a 2k-th, and a $(2k+1)$-th first intermediate number, the first intermediate numbers being derived by steps including:

(i) selecting the 2-th spectral coefficient as the k-th first intermediate number for each integral value of k between 0 and $N/4-1$, and (ii) reversing the sign of the (N−1−2k)-th spectral coefficient to provide a sign-reversed (N−1−2k)-th spectral coefficient, and providing the sign-reversed (N−1−2k)-th spectral coefficient as the k-th first intermediate number for each integral value of k between N/4 to N/2−1, (b) deriving, from the block of N/2 first intermediate numbers, the block of N/4 frequency domain complex numbers, the frequency domain complex numbers having a real part and an imaginary part, and including a k-th frequency domain complex number, the block of frequency domain complex numbers being derived by steps including:

(i) selecting the 2k-th first intermediate number as a real part of the k-th complex number, and (ii) selecting the (2k+1)-th first intermediate number as an imaginary part of the k-th frequency domain complex number, and (iii) multiplying the k-th complex number by an exponential of $(-4\pi jk/N)$ to provide the k-th frequency domain complex number, for each integral value of k from 0 to N/4−1.

15. The method of claim 13, wherein:
(1) the block of N/2 processed samples include an n-th processed sample, where n is an integer between 0 and N−1, and (2) the step of post-processing the block of N/4 time domain complex numbers includes the steps of:

(a) expanding the block of N/4 time domain complex numbers based on periodicity to provide a block of 3N/4 complex numbers, the block of 3N/4 complex numbers including an n-th complex number and a (N/4−1−n)-th complex number, (b) deriving a (N/4−1−n)-th complex conjugate from the (N/4−1−n)-th complex number, (c) summing the (N/4−1−n)-th complex conjugate and the n-th complex number to provide a first sum, and dividing the first sum by two to provide an n-th third intermediate complex number, (d) deriving the n-th fourth intermediate complex number by (i) subtracting the (N/4−1−n)-th complex conjugate and the n-th complex number to provide a difference, (ii) dividing the difference by 2j to provide a quotient, where j is the square root of minus one, and (iii) multiplying the quotient by an exponential of $(-2\pi j(2k+1)/N)$ to provide the n-th fourth intermediate complex number, and (e) deriving a processed sample by (i) summing the n-th third intermediate complex number and the n-th fourth intermediate complex number to provide an n-th fifth intermediate complex number, (ii) multiplying the n-th fifth intermediate complex number by an exponential of $(-\pi j(2k+1)(2N))$ to provide an n-th sixth intermediate complex number having a real part and an imaginary part, and (iii) providing the real part of the n-th sixth intermediate complex number sum as the n-th processed sample.

16. The method of claim 13, wherein:
(1) the block of N/2 processed samples includes an (n+N/4)-th, an (3N/4−1−n)-th, and an (n−3N/4)-th processed sample, each processed sample having a sign, where n is an integer between 0 and N−1, (2) the block of N samples in the time domain includes an n-th sample in the time domain, and (3) the step of multiplying the block of N/2 processed samples in the time domain by an inverse transform window includes the steps of:

(a) deriving, from the block of N/2 processed samples, a block of N intermediate processed samples, the block of N intermediate processed samples including an n-th intermediate processed sample, the block of N intermediate processed samples being derived by steps including:

(i) selecting the (n+N/4)-th processed sample selecting the (n+N/4)-th processed sample as the n-th intermediate processed sample for each integral value of n from 0 and N/4−1, (ii) reversing the sign of the (3N/4−1−n)-th processed sample to provide a sign-reversed (3N/4−1−n)-th processed sample, and providing the sign-reversed (3N/4−1−n)-th processed sample as the n-th intermediate processed sample for each integral value of n from N/4 to 3N/4−1, and (iii) reversing the sign of the (n−3N/4)-th processed sample to provide a sign-reversed (n−3N/4)-th processed sample, and providing the (n−3N/4)-th processed sample as the n-th intermediate processed sample for each integral value of n from 3N/4−1, and (b) multiplying the n-th intermediate processed sample by an inverse transform window for the n-th intermediate processed sample, for each integral value of n from 0 to N−1, to provide the n-th sample in the time domain.

17. A medium for storing a compressed digital signal derived from a digital input signal composed of plural samples in the time domain by a method comprising the steps of:

(1) dividing the digital input signal into blocks of N samples, where N is a multiple of four;

(2) multiplying each block of N samples by a forward transform window to provide a block of N forward transform window processed samples;

(3) digitally preprocessing the block of N forward transform window processed samples to provide a block of N/4 complex numbers;

(4) digitally performing processing equivalent to a Fast Fourier Transform on the block of N/4 complex numbers to provide a transformed block of N/4 complex numbers;

(5) digitally post-processing the transformed block of complex numbers to provide a block of N/2 spectral coefficients;

(6) deriving a block of the compressed digital signal from the block of N/2 spectral coefficients; and (7) recording successive blocks of the compressed digital signal on the medium.

18. The medium of claim 17, wherein:
(1) in the step of multiplying each block of N samples, the block of N forward transform window processed samples includes an n-th sample, a (n+3N/4)-th sample, the (n+3N/4)-th sample having a sign, and a (n−N/4)-th sample, where n is an integer between 0 and (N−1); and (2) the step of preprocessing the block of N forward transform window processed samples includes the steps of:

(a) deriving, from the block of N forward transform window processed samples, a block of first intermediate samples, the block of first intermediate samples including an n-th a (N−1−2n)-th, and a 2n-th first intermediate sample, the block of first intermediate samples being derived by steps including:

(i) reversing the sign of the (n+2N/4)-th sample to provide a sign-reversed (n+2N/4)-th sample, and providing the sign-reversed (n+2N/4)-th sample as the n-th first intermediate sample, for each integral value of n from 0 to N/4−1, and (ii) providing the (n−N/4)-th sample as the nth first intermediate sample, for each integral value of n from N/4 to N−1, (b) deriving, from the block of first intermediate samples, a block of second intermediate samples, the block of second intermediate samples including an n-th, a 2n-th, and a (2n+1)-th second intermediate sample, the block of second intermediate samples being derived by steps including subtracting, for each integral value of n from 0 to N/2−1, the (N−1−2n)-th first intermediate sample from the 2n-th first intermediate sample to provide the n-th second intermediate sample, (c) deriving, from the block of second intermediate samples, the block of N/4 complex numbers, the complex numbers in the block of N/4 complex numbers each having a real part and an imaginary part, and including an n-th complex number, the block of N/4 complex numbers being derived by steps including:

(i) selecting the 2n-th second intermediate sample as a real part of an n-th intermediate complex number, (ii) selecting the (2n+1)-th second intermediate sample as an imaginary part of the n-th intermediate complex number, and (iii) multiplying the n-th intermediate complex number by the exponent of $(-4\pi jn/N)$ to provide the n-th complex number in the block of N/4 complex numbers, for each integral value of n from 0 to N/4−1.

19. The medium of claim 17, wherein:

(1) in the step of digitally post-processing the transformed block of complex numbers, the block of N/2 spectral coefficients includes a k-th spectral coefficient, where k is an integer between 0 and N/2−, and (2) the step of post-processing the transformed block of complex numbers includes the steps of:

(a) expanding the transformed block of N/4 complex numbers based on periodicity to provide a block of N/2 complex numbers, the block of N/2 complex numbers including a k-th complex number and a (N/4−1−k)-th complex number, (b) deriving a (N/4−1−k)-th complex conjugate from the (N/4−1−k)-th complex number, (c) deriving a k-th third intermediate complex number by (i) summing the (N/4−1−k)-th complex conjugate and the k-th complex number to provide a sum, and (ii) dividing the sum by two to provide the k-th third intermediate complex number, (d) deriving a k-th fourth intermediate complex number by (i) subtracting the (N/4−1−k)-th complex conjugate from the k-th complex number to provide a difference, (ii) dividing the difference by 2j to provide a quotient, where j is the square root of minus one, and (iii) multiplying the quotient by the exponential of $(-2\pi j)(2k+1/N)$ to provide the k-th fourth intermediate complex number, (e) deriving the k-th spectral coefficient by (i) summing the k-th third intermediate complex number and the k-th fourth intermediate complex number to provide a k-th fifth intermediate complex number, (ii) multiplying the k-th fifth intermediate complex number by an exponential of $(-\pi j(2k+1)(2N))$ to provide a k-th sixth intermediate complex number having a real part and an imaginary part, and (iii) providing the real part of the k-th sixth intermediate complex number sum as the k-th spectral coefficient.

20. The medium of claim 17, wherein:

(1) in the step of digitally post-processing the transformed block of complex numbers, the block of N/2 spectral coefficients includes a k-th spectral coefficient, where k is an integer between 0 and N/2−1, and (2) step of post-processing the transformed block of complex numbers includes the steps of:

(a) expanding the transformed block of N/4 complex numbers based on periodicity to provide a block of 3N/4 complex numbers, the complex numbers in the block of 3N/4 complex numbers having a real part and an imaginary part, and including a k-th complex number and a (N/4−1−k)-th complex number;

(b) determining:

(i) a sum, the sum being one half of a sum of the cosine of $(2\pi)(2k+1)/4N$ and sine of $(10\pi)(2k+1)/4N$, (ii) a first difference, the first difference being one half of a difference between the cosine of $(2\pi)(2k+1)/4N$ and the sine of $(10\pi)(2k+1)/4N$, and (iii) a second difference, the second difference being one half of a difference between and sine of $(10\pi)(2k+1)/4N$ and the cosine of $(2\pi)(2k+1)/4N$;

(c) multiplying:

(i) the real part of the k-th complex number by the first difference to provide a first intermediate number, (ii) the real part of the (N/4−1−k)-th complex number by the sum, to provide a second intermediate number, (iii) the imaginary part of the k-th complex number by the sum to provide a third intermediate number, and (iv) the imaginary part of the (N/4−1−k)-th complex number by the second difference to provide a fourth intermediate number; and (d) summing the first, the second, the third, and the fourth intermediate numbers to provide the k-th spectral coefficient.

21. The medium of claim 17, wherein the medium is an optical disc.

22. The medium of claim 17, wherein the medium comprises a semiconductor memory.

23. The medium of claim 17, wherein the medium comprises a magnetic tape.

* * * * *